(12) United States Patent
Taal

(10) Patent No.: US 8,162,798 B2
(45) Date of Patent: Apr. 24, 2012

(54) METHOD AND DEVICE FOR CONTROLLING AN AUTOMATIC TRANSMISSION

(75) Inventor: Martin B. Taal, Cologne (DE)

(73) Assignee: Ford Global Technologies LLC, Dearborn, MI (US)

( * ) Notice: Subject to any disclaimer, the term of this patent is extended or adjusted under 35 U.S.C. 154(b) by 246 days.

(21) Appl. No.: 12/727,315

(22) Filed: Mar. 19, 2010

(65) Prior Publication Data

US 2010/0240484 A1  Sep. 23, 2010

(30) Foreign Application Priority Data

Mar. 20, 2009  (DE) .......................... 10 2009 014 240

(51) Int. Cl.
*F16H 61/00*  (2006.01)
(52) U.S. Cl. ........................................ 477/114; 477/901
(58) Field of Classification Search .................. None
See application file for complete search history.

(56) References Cited

U.S. PATENT DOCUMENTS

| 5,620,386 | A | * | 4/1997 | Jamzadeh ..................... 475/140 |
| 5,788,596 | A | * | 8/1998 | Robinson et al. ............. 475/118 |
| 5,906,559 | A | * | 5/1999 | Murasugi et al. ............... 477/93 |
| 7,946,943 | B2 | * | 5/2011 | Taal ............................. 475/123 |

* cited by examiner

*Primary Examiner* — Dirk Wright
(74) *Attorney, Agent, or Firm* — David B. Kelley, Esq.; MacMillan, Sobanski & Todd, LLC

(57) ABSTRACT

The invention relates to a method for controlling an automatic transmission having a torque converter, with the transmission having three gear sets and with the first gear set which has a first brake clutch and a second brake clutch being braked relative to the housing by means of simultaneous actuation of the first and second brake clutches, as a result of which an output shaft which is directly connected to the first gear set is likewise braked. The third gear set is connected in terms of gearing to an input shaft and to the first gear set and can be fixed relative to the housing by means of a third brake clutch. The simultaneous actuation of the first and second brake clutches takes place at least intermittently with the third brake clutch in a slipping state, controlling the speed of the torque converter relative to the engine.

10 Claims, 1 Drawing Sheet

| Gear | C1 | C2 | B1 | B2 | B3 |
|---|---|---|---|---|---|
| 1 | | | | X | X |
| 2 | | | X | | X |
| 3 | | X | | | X |
| 4 | X | | | | X |
| 5 | X | X | | | |
| 6 | X | | X | | |
| R | | X | | X | |
| NIC | | | X | X | Slip | ns
METHOD AND DEVICE FOR CONTROLLING AN AUTOMATIC TRANSMISSION

CROSS REFERENCE TO RELATED APPLICATIONS

This application claims priority to and the benefit of German Application Number DE 102009014240.1, Filed Mar. 20, 2009, the full disclosure of which is incorporated herein by reference.

BACKGROUND OF THE INVENTION

The invention relates to a method for controlling an automatic transmission, and to an automatic transmission which is controlled in this way.

Motor vehicles having an internal combustion engine and an automatic transmission having a torque converter consume an unnecessarily large amount of fuel when at a standstill with a gear stage selected, for example in shift position "D", since the internal combustion engine works via the torque converter against the stationary converter turbine. Furthermore, the operating state, in particular in diesel engines, can lead to unpleasant vibration excitations and noises in the drivetrain.

DE 19912480 A1 discloses an automatic transmission having three single planetary gear sets and having hydrodynamic torque converters, which automatic transmission has a "braked neutral" position. In a "braked neutral" position, the sun gear and the planet carrier of the first planetary gear set are fixed in a non-rotatable manner relative to the housing by means of two brake clutches as a result of simultaneous actuation of the first and second brake clutches, as a result of which the drive output shaft which is directly connected to the ring gear of the first planetary gear set is likewise locked. Furthermore, a third brake clutch which is connected to the third planetary gear set is opened. In this way, no torque can be transmitted between the input shaft and output shaft, and the input shaft can rotate freely. The "braked neutral" position is automatically selected by the transmission controller when the vehicle comes to a standstill with a gear stage (D, 1, 2, 3, 4 etc.) selected.

However, the complete opening of the third brake clutch leads to unacceptable shocks during starting, since the third brake clutch must first be placed quickly into the contact position. Complete prevention of a jerk when departing from the "braked neutral" position shortly before starting is barely possible, in particular if the throttle pedal is depressed quickly after the footbrake is released. This is linked to the effect of the vehicle being driven as a result of the braking of the turbine inertial mass. Since the footbrake has already been released, the vehicle experiences a slight acceleration which ends once the turbine has come to a standstill. The faster the turbine is braked and the faster the vehicle is thereby ready for starting, the more clearly perceptible the jerk will be.

SUMMARY OF THE INVENTION

It is an object of the present invention to provide a method for controlling an automatic transmission which enables an effective reduction in fuel consumption and idle vibrations and also prevents backward rolling when the wheel brake is released and prevents a jerk when departing from the "braked neutral" position during starting.

By virtue of the simultaneous actuation of the first and second brake clutches taking place at least intermittently with the third brake clutch in a slipping state, it is possible in the "braked neutral" position for the amount of drive torque transmitted between the input shaft and output shaft to be adjusted by means of the slip of the third brake clutch. This method is referred to hereinafter as "NIC" for Neutral Idle Control. The low drive torque of the rotating turbine which has been placed into the NIC position is supported by the first and second brake clutches which are closed when at a standstill, and is not conducted via the output shaft to the vehicle, and as a result, complete decoupling of the axle shafts of the vehicle from the engine torque is obtained. The entire control takes place with the axle shafts being bypassed internally within the transmission housing. The transmission of torque and of vibrations to the output shaft is effectively reduced in this way. At the same time, however, the slipping third brake clutch is in an active state. When the driver inputs a demand for starting the vehicle by actuating the throttle pedal and thereby increasing the engine speed, the third brake clutch can be engaged very rapidly while the first and/or second brake clutch opens, as a result of which a very spontaneous start of the vehicle is possible even though the input shaft was transmitting barely any drive torque in the NIC position.

Where reference is made here to brake clutches, this is not to be understood as being restrictive with regard to the exact technical design. Here, brake clutches are to be understood to mean suitable clutches which can firmly support or brake a shaft or a gearwheel with respect to the transmission housing such that the shaft or gearwheel rotates more slowly or no longer rotates. It is self-evident that the brake clutch specified here may also be designed as a brake band or in any other suitable way for fulfilling the braking function according to the invention.

The turbine preferably rotates at least intermittently at a speed which lies close to, preferably at, 50 to 100 revolutions per minute below the idle speed of the internal combustion engine. The speed is set at the third brake clutch as a result of a corresponding slip torque. As a result of the low speed difference between the internal combustion engine and the input shaft, only small drag torques and therefore also only low levels of vibration and noise are generated. Secondly, as a result of the dragging operation of the third brake clutch, the latter is active and will engage immediately when acted on with full clutch pressure, as a result of which the full transmission torque is immediately applied to the output shaft if the first and/or second brake clutch is released, and at the same time. This may lead to the third brake clutch briefly being actuated simultaneously with the first and second brake clutches.

According to one preferred embodiment of the invention, the actuation of the first and second brake clutches is maintained until the turbine speed is zero, or if the vehicle is standing on a gradient, until the engine torque has risen to a sufficient level to prevent backward rolling when the brake clutches are released. In this way, it is firstly possible in particular to prevent an undesired forward movement of the vehicle, as is otherwise frequently observed, when departing from idle operation, which is also referred to as "neutral idle exit jerk" and is based on the inertial effect of a rapid decrease in speed of the turbine shortly before the internal combustion engine begins to generate the drive torque; secondly, it is possible in this way to prevent the undesired backward rolling in the phase in which the driver has already released the footbrake but the engine torque has not yet risen to a sufficiently high level.

A braking of the moment of inertia of the turbine leads to an acceleration of the moment of inertia of the vehicle when the turbine and vehicle are in engagement via the input clutch. The effect is prevented according to the invention if the first and second brake clutches remain actuated until the turbine speed is zero. Although there is a clutch connection between the turbine and vehicle in the braking phase, there is also the further resulting positive effect that the input clutch can be quickly locked without further regulation, which enables the vehicle to be started more quickly. According to the preferred embodiment of the invention, therefore, the inertial torque is supported by the brake clutches since the latter remain actuated until the turbine speed is zero.

According to a further preferred embodiment of the invention, the third brake clutch is temporarily fully released in order to enable a slight rotation of gearwheels of the third planetary gear set, and to thereby remove any residual loads from the shift position before the NIC position by releasing load from the side shafts, which act as a torsion spring.

According to a further preferred embodiment of the invention, the simultaneous actuation of the first and second brake clutches takes place only when the vehicle is at a standstill. This is important since an inadvertent actuation of the first and second brake clutches would lead to the transmission locking, which must imperatively be avoided while the vehicle is moving. Since the shift state is logically provided, reliable or redundant monitoring of the output speed or the speed at which the vehicle is travelling must take place.

BRIEF DESCRIPTION OF THE DRAWINGS

Further embodiments of the invention may be gathered from the description and from the claims. The invention is explained below on the basis of a preferred embodiment and with reference to the appended figures, in which:

DETAILED DESCRIPTION

Figures 1, 2:
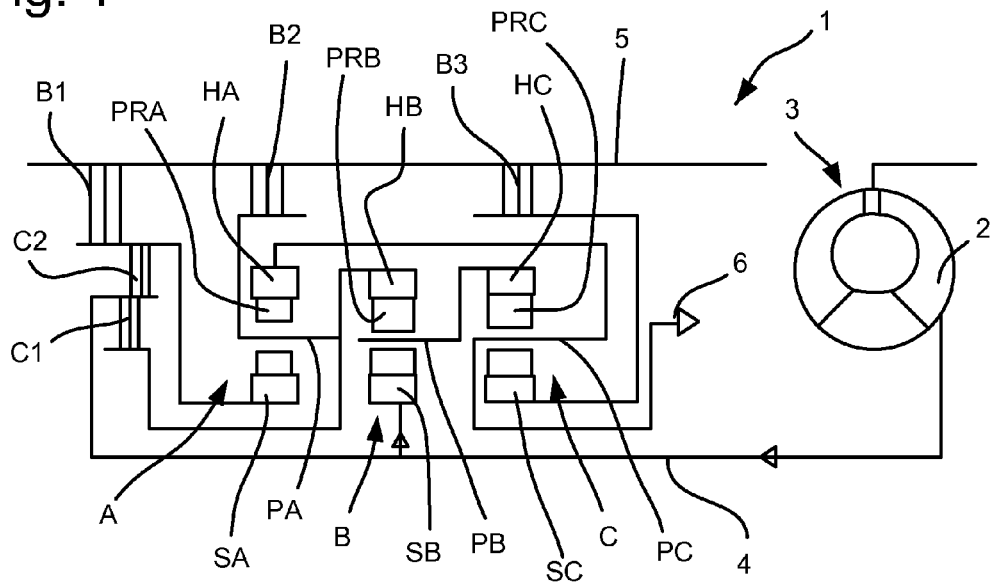
FIG. 1 shows a schematic view of a six-gear automatic transmission in which the control according to the invention is realized in one preferred embodiment.
FIG. 2 shows an actuation table of the six-gear automatic transmission from FIG. 1.

The method and the device according to the invention for controlling an automatic transmission are realized in a six-gear automatic transmission 1 which is schematically illustrated in FIG. 1 and which combine three single-stage planetary gear sets A, B and C with one another. Each planetary gear set A, B, C has in each case one sun gear SA, SB, SC, one planet gear PRA, PRB, PRC, one planet carrier PA, PB, PC and one ring gear HA, HB, HC. FIG. 2 shows the associated shift table of the transmission 1.

The turbine 2 of the torque converter 3 is coupled to the input shaft 4 of the transmission 1. The input shaft 4 is in turn firmly connected to a second sun gear SB of the second planetary gear set B. The input shaft 4 can be fixed to, that is to say placed in rotationally firm connection with, the first planet gear carrier PA by means of the first shift clutch C1 and can be fixed to, that is to say placed in rotationally firm connection with, the first sun gear SA by means of a second shift clutch C2. Here, shift clutches are to be understood to mean suitable clutches which can fix two rotating transmission parts, such as shafts or gearwheels, relative to one another such that they rotate at the same speed.

The first sun gear SA of the first planetary gear set A is assigned a first brake clutch B1, with which the first sun gear SA can be fixed relative to the housing 5. The first planet carrier PA of the first planetary gear set A is assigned a second brake clutch B2, with which the first planet carrier PA can likewise be fixed relative to the housing 5. To support the third sun gear SC on the housing 5, a third brake clutch B3 is provided.

The first planet gear carrier PA is also firmly connected to a second ring gear HB of the second planetary gear set B, the second planet gear carrier PB is firmly connected to a third ring gear HC of the third planetary gear set C, and the third planet gear carrier PC is firmly connected to the first ring gear HA of the first planetary gear set A. The third planet gear carrier PC is also connected to the output shaft 6.

The usual shift arrangement in the first gear of the automatic transmission having the 3 gear sets A, B and C is the closure of the second and third brake clutches B2, B3. This causes the vehicle to be driven, as follows. The turbine torque drives the sun gear SB of the planetary gear set B. The ring gear HB is fixed by means of the second brake clutch B2 to the housing, as a result of which the planet carrier PB is rotated, and therefore the ring gear HC is also rotated. Because the third brake clutch B3 is closed, the sun gear SC is stationary, as a result of which the planet carrier PC and therefore the output shaft 6 are driven.

In the NIC position, as a result of the actuation of the brake clutches B1 and B2, both the planet carrier PA and also the sun gear SA of the planetary gear set A are fixed to the housing 5. The first planet carrier PA, and with it the third planet carrier PC and the output shaft 6, are also locked in this way. This all takes place internally within the transmission. The torque generated by means of the turbine 2 drives the second planet carrier PB via the second sun gear SB, and with the second planet carrier PB also the third ring gear HC which is connected thereto, as a result of which the third planet gear PRC, which rotates around the planet axle which is stationary because it is locked, drives the third sun gear SC. The speed of the third sun gear SC is determined by the slipping brake clutch B3 which is connected thereto, which in turn by repercussion also determines the turbine rotational speed via the described chain. The reaction force on the planet carrier PC generated by the drive train is not supported by the vehicle which is connected via the drive shafts, as is the case during driving, but rather according to the invention is supported by the much more rigid inner transmission elements and the first and second brake clutches B1 and B2.

Since the slip of the brake clutch B3 is determined by the turbine speed, it is hereby possible to determine the turbine torque or transmission input torque in a known way. It is thereby possible to set an optimum ratio of turbine and engine torque in order to keep the fuel consumption and vehicle vibrations as low as possible and at the same time to optimize the starting comfort, that is to say jerk-free and quick starting is possible from the NIC position.

It is also not prejudicial to the concept if a freewheel is arranged in parallel with the second brake clutch B2, which freewheel performs the function of the second brake clutch B2 in the first gear during driving, while the freewheel can be overrun in the overrun mode. In any case, in the NIC position, the second brake clutch B2 is engaged.

While certain embodiments of the present invention have been described in detail, those familiar with the art to which this invention relates will recognize various alternative designs and embodiments for practicing the invention as defined by the following claims.

What is claimed is:

1. A method for controlling an automatic transmission having a hydrodynamic torque converter in a vehicle driven by means of an internal combustion engine, the method comprising the steps of:

(a) braking a first planetary gear set, which has a first brake clutch and a second brake clutch, such that the first planetary gear set is fixed in a non-rotatable manner relative to a transmission housing in a braked neutral position by means of simultaneous actuation of the first and second brake clutches, wherein an output shaft that is directly connected to the first planetary gear set is likewise locked, and (b) simultaneously with step (a), actuating a third brake clutch into a slipping state, wherein a second planetary gear set is connected in terms of gearing to an input shaft and to the first planetary gear set, and the second planetary gear set is fixable relative to the transmission housing by means of the third brake clutch.

2. The method of claim 1 including step (c), intermittently, simultaneously actuating the first, second and third brake clutches.

3. The method of claim 1 including step (c) intermittently rotating a turbine, which is connected to the input shaft, of the torque converter at a speed of about 50 to 100 revolutions per minute below an idle speed of the internal combustion engine.

4. The method of claim 1 wherein step (a) is further defined by the simultaneous actuation of the first and second brake clutches being maintained until the internal combustion engine is capable of imparting forward propulsion to the vehicle and preventing backward rolling of the vehicle on a gradient.

5. The method of claim 1 including step (c) temporarily fully releasing the third brake clutch in order to enable a slight rotation of gearwheels of the second planetary gear set.

6. The method of claim 1 wherein step (a) is further defined the simultaneous actuation of the first and second brake clutches taking place only when the vehicle is at a standstill.

7. The method of claim 1 wherein step (a) is further defined by the first brake clutch engaging a first sun gear of the first planetary gear set and the second brake clutch engaging a first planet carrier of the first planetary gear set.

8. The method of claim 7 wherein step (b) is further defined by the third brake clutch engaging a second sun gear of the second planetary gear set.

9. The method of claim 7 wherein the input shaft is selectively fixable by means of a first shift clutch relative to the first planet gear carrier and selectively fixable by means of a second shift clutch relative to the first sun gear.

10. The method of claim 7 wherein the input shaft is firmly connected to a third sun gear of a third planetary gear set, the first planet gear carrier is firmly connected to a third ring gear of the third planetary gear set, a third planet gear carrier is firmly connected to a second ring gear of the second planetary gear set, and second planet gear carrier is firmly connected to a first ring gear of the first planetary gear set and to the output shaft.

* * * * *